Jan. 27, 1959
H. J. THOMISZER
2,870,779
AUTOMATIC CHECK VALVE
Filed Dec. 9, 1955
3 Sheets-Sheet 3
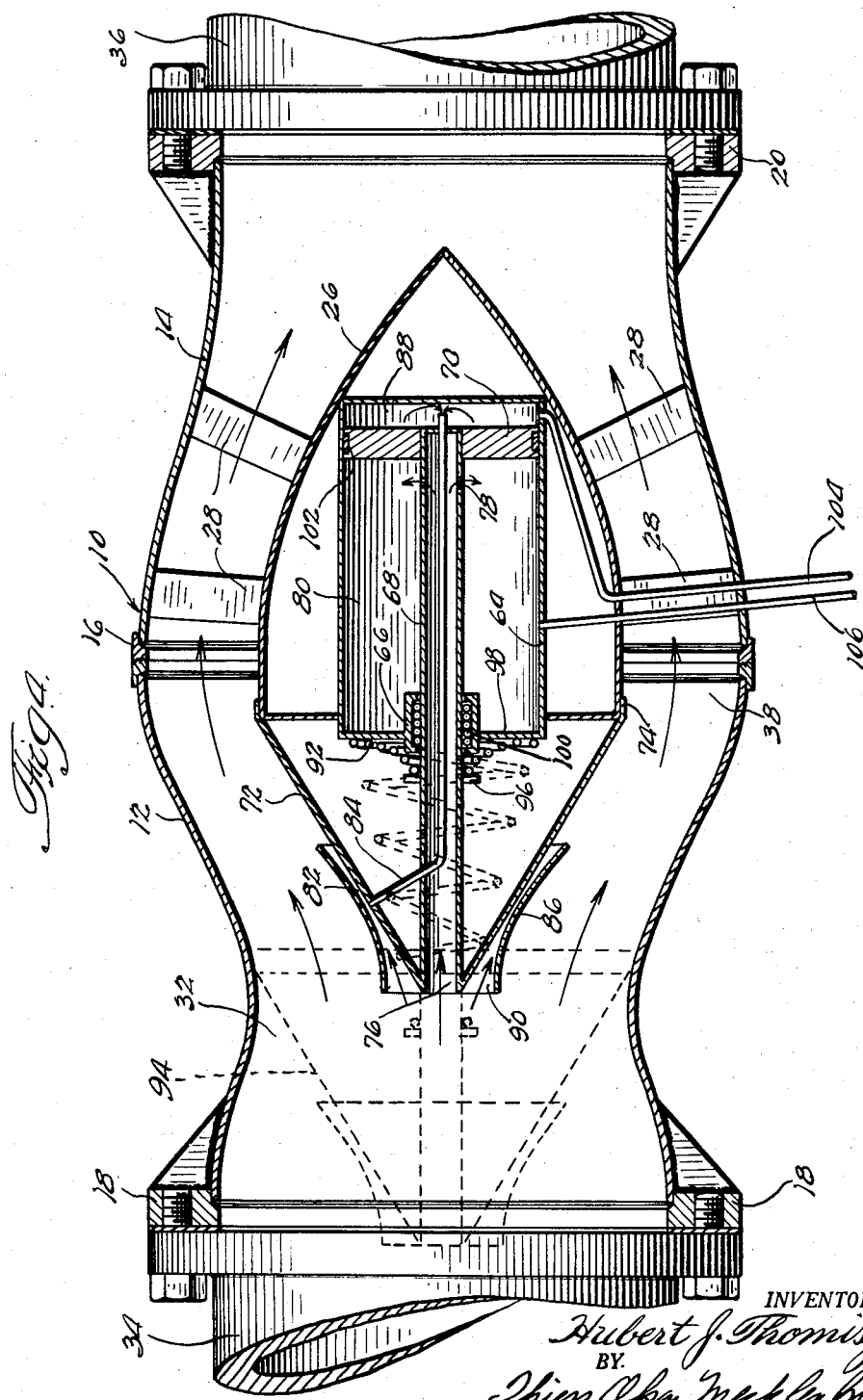
INVENTOR.
Hubert J. Thomiszer
BY
Thiess, Olson, Mecklenburger,
von Holst, & Coltman. Pttys.

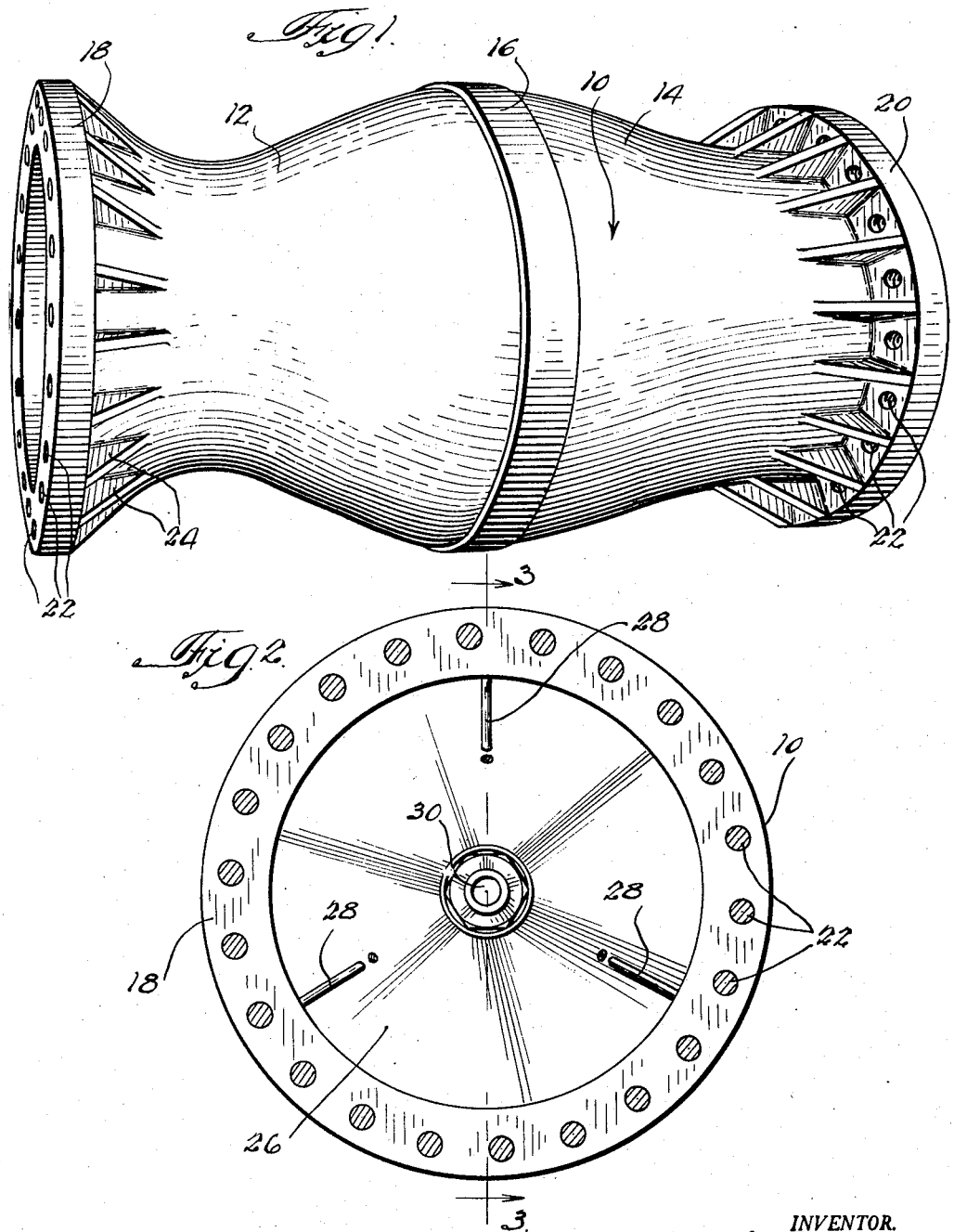

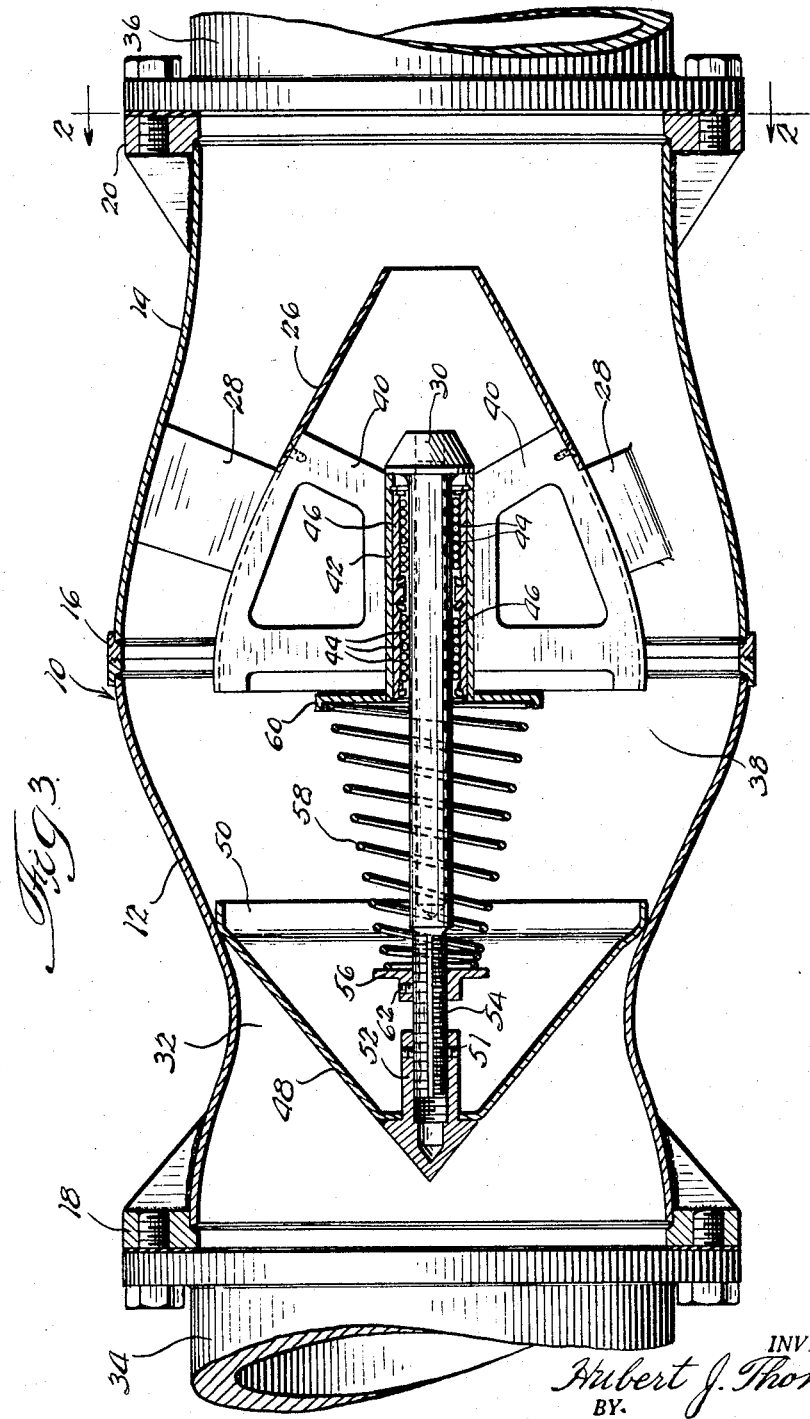

United States Patent Office 2,870,779
Patented Jan. 27, 1959

2,870,779

AUTOMATIC CHECK VALVE

Hubert J. Thomiszer, Skokie, Ill., assignor, by mesne assignments, to Cook Electric Company, Chicago, Ill., a corporation of Delaware Application December 9, 1955, Serial No. 552,092

2 Claims. (Cl. 137—219)

This invention relates to improved valve apparatus and more particularly to an improved automatic check valve to prevent the reverse flow of fluid in a system having normal unilateral flow.

Check valves have heretofore been utilized in hydraulic and pneumatic systems as well as fuel systems and the like to prevent the inadvertent reverse flow of fluids as a result of abnormal differential pressures in the system. Such valves have utilized flexible diaphragms, sliding elements, floats and the like to sense the reverse flow and automatically seal the system. Valves of these types are generally designed to fit the particular needs of a given system and none operates satisfactorily in all systems. The instant invention provides a versatile valve applicable to many situations for which the prior art valves were ill suited.

It is one object of this invention to provide an improved automatic valve providing a seal to permit unilateral flow and to prevent the reverse flow of fluid therethrough.

It is another object of this invention to provide an improved automatic check valve having a substantially constant pressure drop thereacross for all partially open positions.

It is still another object of this invention to provide an improved automatic check valve having a low pressure drop thereacross for all positions of the valve.

It is a further object of this invention to provide an improved automatic check valve operative over a wide range of fluid pressures, velocities and temperatures.

It is another object of this invention to provide an improved automatic check valve having auxiliary externally controllable means for valve operation.

It is still a further object of this invention to provide an improved automatic check valve having a low pressure drop which utilizes the impact pressure and venturi action of fluid flowing therethrough to facilitate valve operation.

Further and additional objects of this invention will become manifest from a consideration of this description, the accompanying drawings and the appended claims.

In one form of this invention a housing is provided for connection between two flanged ends of pipes or conduits forming a part of a pressurized fluid system. More particularly, the housing is provided with a restricted portion and an adjacent enlarged portion, the fluid flow normally being in the direction from the restricted portion toward the enlarged portion, and a movable conical closure adapted to seal the housing at the restricted portion and being positioned in the enlarged portion during normal operation of the fluid system. The enlarged portion and closure are so designed and dimensioned that a substantially constant fluid path may be provided therethrough with a minimum pressure drop across the entire valve apparatus. Auxiliary means may be provided as disclosed in an alternate embodiment of the invention to facilitate movement of the conical closure and such auxiliary means may either be controlled by the fluid flow in the system or by external means.

For a more complete understanding of this invention reference will now be made to the accompanying drawing wherein:

Figure 1 is a perspective view of one embodiment of this invention;

Fig. 2 is an end view of the embodiment of Fig. 1;

Fig. 3 is a longitudinal sectional view of the embodiment of Fig. 1, taken on the line 3—3 of Fig. 2; and Fig. 4 is a longitudinal sectional view of an alternate internal structure which may be incorporated in the embodiment of Fig. 1.

Referring now to the drawings and more particularly to Figs. 1 and 2, the external appearance of valve apparatus incorporating the invention is illustrated. The valve comprises a housing 10 of two shaped sections 12 and 14 secured together by a central peripheral band 16. The band 16 may be welded to the sections 12 and 14 or attached thereto in any appropriate manner. The otherwise free ends of the sections 12 and 14 have flanges 18 and 20 formed thereabout which are adapted to abut correspondingly flanged portions of open ended pipes or conduits of a fluid system to be controlled. The flanges 18 and 20 are provided with a plurality of apertures 22 disposed about the entire surface thereof and these apertures align with corresponding apertures in the pipe flanges whereby bolts and associated nuts provide a pressure-tight seal between the abutting flanges. The flanges 18 and 20 are provided with a plurality of fillets or webs 24 which provide the necessary reinforcing for the flanged portions.

Referring more particularly to Fig. 2 a central support 26 can be seen in the open end of the housing 10. The central support 26 is maintained in spaced relationship from the internal surface of the housing 10 by three vanes or struts 28. A central shaft 30 which carries the valve closure element to be described is centrally located in the support 26.

Referring to Fig. 3, the internal structure and operation of one embodiment of this invention will be more particularly described. The housing 10 has in the forward section 12 a substantially restricted portion 32. That is, the cross section of the housing at portion 32 is generally circular and of substantially smaller diameter than the internal diameter of the adjacent pipe sections 34 and 36. Adjacent to the restricted portion 32 is an enlarged portion 38 having a cross section greater than the cross section of pipes 34 and 36. The central support 26, already described, is mounted on struts 28 and disposed in the enlarged portion 38. The dimensions of the enlarged portion 38 and support 26 are such that the total cross-sectional area available for fluid flow in area 38 is of the same order as the cross-sectional area of the adjacent pipes 34 and 36. Thus, the velocity of fluid through the valve described herein at the enlarged portion 38 will be substantially the same as the velocity of the fluid in the pipes 34 and 36. However, at the restricted portion 32 the fluid velocity will be substantially increased as the cross section is less than the cross section in the remainder of the fluid system.

A plurality of webs 40 are secured within the central support 26 and support a longitudinal ball bushing 42 substantially on the central axis of the housing 10. The shaft 30 is supported within the ball bushing 42 and is freely mounted for longitudinal movement along the housing axis. The ball bushing herein illustrated comprises a plurality of steel balls 44 mounted in appropriate races 46 and it has been found that this bushing functions satisfactorily, even at extremely high temperatures. However, it will be apparent that any bushing having the desired characteristics of rigidity with longitudinal freedom may be employed. A valve closure 48 is carried at the forward end of shaft 30. The closure 48 has a generally conical configuration with a shaped generally cylindrical peripheral edge 50. The closure 48 has a central threaded mounting hub 52 which threadedly engages the forward threaded portion 54 of shaft 30. Also threaded on portion 54 is a spring stop 56. An involute spring 58 is normally compressed between the stop 56 and a retainer 60 secured to the bushing 42.

The adjustment of threaded stop 56 determines the normal compression of spring 58. A set screw 62 is provided to lock the stop 56 in a predetermined position to retain a desired degree of spring compression. Similarly, a set screw 51 is provided in hub 52 whereby the hub may be adjusted and locked to maintain a predetermined minimum spacing between housing 10 and closure 48, or a complete seal may be provided. The adjustment of the closure mounting 52 and spring stop 56 will generally be coordinated so that in the absence of fluid pressure in pipe 34 the closure 48 will be maintained in the extended position immediately adjacent to the restricted portion 32 to provide an effective fluid seal therebetween. Thus, if a pressure exists in the pipe 36 reverse flow of fluid from right to left in Fig. 3 is prevented. The force normally maintained in spring 58 when closure 48 is fully extended is about 1.5 pounds.

For increased pressures in pipe 34, closure 48 will be moved to the right against the force of spring 58. Spring 58 is an involute spring so selected that with increasing velocities of fluid in pipe 34 the closure 48 will be progressively moved toward the support 26 without any substantial increase in the pressure drop within the valve apparatus. The fluid in pipe 34 is traveling a generally straight linear path until deflected by closure 48. Thus increasing fluid velocity through pipe 34 produces increasing force against closure 48 due to the fluid deflection, and the spring 58 is thus compressed. When the closure 48 has been moved through its entire range of travel as a result of maximum pressure and fluid flow through pipe 34, the closure 48 and support 26 cooperate to form a generally ovoid configuration. Thus, the generally ovoid configuration of the closure 48 and support 26 conforms approximately to the bulbous shape of the enlarged portion 38 of housing 10 whereby generally smooth nonturbulent fluid flow is provided through the valve with losses therein sufficient only to maintain the closure 48 in its retracted position.

An alternate embodiment is illustrated in Fig. 4 wherein a booster system is provided utilizing either external fluid pressure or the impact pressure and fluid velocity of the system being controlled. In the embodiment of Fig. 4, substantially the same housing 10 as already described is connected to two adjacent pipe sections 34 and 36 by a pair of apertured flanges 18 and 20. The housing 10 has a restricted portion 32 and an enlarged portion 38 for the purposes already described. The support 26 is mounted on struts 28 and has substantially the same general contour as support 26 of Fig. 3. However, contained within the support 26 of Fig. 4 is a cylinder 64 in which is mounted a bushing 66. The bushing 66 is generally like the ball bushing 42 already described. A hollow shaft 68 is mounted for longitudinal movement through bushing 66 and has at one end thereof a piston 70 which sealingly engages the walls of cylinder 64.

At the forward end of hollow shaft 68 a generally conical valve closure 72 is mounted. The valve closure 72 has a cylindrical peripheral edge 74 much like the closure 48 shown in Fig. 3. However, the hollow shaft 68 extends to the forward end of the closure 72 where an open fluid inlet 76 is provided which is directed forwardly along the axis of the housing 10 toward the restricted portion 32. A plurality of apertures 78 are provided in the hollow shaft 68 to communicate with the forward cavity 80 of cylinder 64. Thus, as the pressure and fluid flow in pipe 34 are increased impact pressure is applied to inlet 76 and transmitted through hollow shaft 68 and apertures 78 to the forward cavity of cylinder 64. Thus the impact pressure of fluid at inlet 76 tends to move the piston 70 rearwardly, opening the valve and permitting fluid flow therethrough. This improves operation of the valve and reduces the resistance of the valve to forward fluid flow and consequently reduces the overall pressure drop in the device.

A shaped funnel-like crown 86 is secured on the forward portion of valve closure 72. The crown 86 is somewhat flared at its forward end 90 and has a restricted cross section in the central portion 82. Therefore venturi action produces high velocity fluid motion at the central portion 82 and consequently reduced pressure at that point. A fluid conduit 84 extends from the central portion 82 into the hollow shaft 68 and through the hollow shaft 68 to the rearward cavity 88 of cylinder 64.

As a result of venturi action the pressure at the central section 82 is low and consequently the pressure in the rearward cylinder portion 88 is substantially reduced. Thus, further auxiliary force is provided for moving the closure 72 rearwardly to the position illustrated in Fig. 4 when fluid flow and pressure are present in pipe 34. An involute spring 92 similar to the spring described with regard to Fig. 3 is provided to normally maintain the closure 72 in the forward valve closing position indicated by broken lines 94. The spring 92 is compressed between the stop 96 adjustable on the shaft 68 and the forward wall 98 of the cylinder 64. A pressure-tight seal 100 is provided at the point where hollow shaft 68 enters cylinder wall 98 and a conventional sealing ring 102 is provided in piston 70 to seal the juncture of the piston 70 and cylinder 64. All of the parts are adapted to withstand high temperatures whereby the valve is especially useful for jet aircraft applications.

External control of the position of piston 70 is also provided. Conduit 104 connects an external source of fluid pressure to the rearward cylinder cavity 88 whereby the piston may be moved or assisted by fluid pressure controlled from a remote position such as the cabin or cockpit of an aircraft. Similarly, conduit 106 connects a source of fluid pressure to the forward cylinder cavity 80 to retract the piston 70. Valve means may be provided in the various conduits to restrict fluid flow therein or resistance to fluid flow in the relatively small conduits may be relied upon to produce the desired differential pressures on the piston 70.

As clearly illustrated in Figs. 3 and 4, the valve apparatus herein described provides means for checking the reverse flow of fluid from pipe 36 to pipe 34 and accomplishes this with a minimum pressure drop in the system and in a simple and reliable device. The device relies upon the force exerted on closures 48 and 72 resulting from the deflection of the flowing fluid from the normal straight linear path to produce rearward or retracting motion of the closures toward the associated supports 26. The housing has a smooth continuous inner surface free of any abrupt discontinuities or sources of resistance or turbulence and the combined shape of the closure and support conforms generally to the contour of the enlarged portion of the housing whereby smooth relatively unimpeded fluid flow is insured.

While two particular embodiments of this invention have been described in detail, it will be clear that one skilled in the art may employ this invention to produce the novel and advantageous features described herein without departing from the spirit and scope of this invention.

For example, while a flanged, bolted assembly is described herein, it will be clear that the valve housing may be incorporated into the fluid line in any convenient manner and secured there by welding, clamping and the like. Also various supports and contours may be substituted in the fluid path to produce predetermined flow characteristics and desirable streamlining.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. Fluid valve apparatus producing a low, substantially constant pressure drop comprising housing means defining a linear fluid path between an inlet aperture and an outlet aperture, said housing means having a restricted portion adjacent said inlet aperture and an adjacent enlarged portion, the inner surface of said housing having a substantially smooth continuous surface, support means centrally disposed in said enlarged portion, elongate bushing means mounted in said support substantially on the axis of said housing, a shaft mounted in said bushing for longitudinal movement, a smooth tapering valve closure mounted on said shaft for movement along said axis between a position adjacent said support and a position closing said restricted portion, said closure and said support defining a generally ovoid body when said closure is in full open position, means for controlling the position of said closure including a cylinder mounted on said support and piston means mounted on said shaft slidable in said cylinder, means for creating differential fluid pressure in said cylinder to control the position of said piston including a conduit having an inlet in said fluid path and directed toward said inlet restricted portion communicating with one end of said cylinder, venturi means mounted on said closure, and conduit means connecting the other end of said cylinder and a point of low pressure in said venturi means, and involute spring means urging said closure toward said inlet aperture against said housing at the restricted portion to form a seal therebetween.

2. Fluid valve apparatus producing a low, substantially constant pressure drop comprising housing means defining a linear fluid path between an inlet aperture and an outlet aperture, said housing means having a restricted portion adjacent said inlet aperture and an adjacent enlarged portion, the inner surface of said housing having a substantially smooth continuous surface, support means centrally disposed in said enlarged portion, elongate bushing means mounted in said support substantially on the axis of said housing, a shaft mounted in said bushing for longitudinal movement, a smooth tapering valve closure mounted on said shaft for movement along said axis between a position adjacent said support and a position closing said restricted portion, said closure and said support defining a generally ovoid body when said closure is in full open position, means for controlling the position of said closure including a cylinder mounted on said support and piston means mounted on said shaft slidable in said cylinder, means for creating differential fluid pressure in said cylinder to control the position of said piston including a conduit having an inlet in said fluid path and directed toward said inlet restricted portion communicating with one end of said cylinder, venturi means mounted on said closure, and conduit means connecting the other end of said cylinder and a point of low pressure in said venturi means, conduit means communicating with each end of said cylinder for the selective application of external fluid pressure thereto, and involute spring means urging said closure toward said inlet aperture against said housing at the restricted portion to form a seal therebetween.

References Cited in the file of this patent

UNITED STATES PATENTS

| | | |
|---|---|---|
| 845,063 | Desper | Feb. 26, 1907 |
| 968,597 | Parkin | Aug. 30, 1910 |
| 1,030,890 | Johnson | July 2, 1912 |
| 1,723,359 | Larner | Aug. 6, 1929 |
| 2,052,572 | Kerr | Sept. 1, 1936 |
| 2,063,821 | McKenzie | Dec. 8, 1936 |
| 2,289,946 | Weatherhead | July 14, 1942 |